Aug. 24, 1937.  T. P. WRIGHT  2,090,775
TWISTED FAIRING
Filed March 30, 1934

INVENTOR.
THEODORE P. WRIGHT.
BY
ATTORNEYS.

Patented Aug. 24, 1937

2,090,775

UNITED STATES PATENT OFFICE 2,090,775

TWISTED FAIRING

Theodore P. Wright, Buffalo, N. Y., assignor, by mesne assignments, to Curtiss-Wright Corporation, a corporaton of New York Application March 30, 1934, Serial No. 718,118

3 Claims. (Cl. 244—130)

This invention relates to aircraft, and is particularly concerned with improvements in the streamlining of struts or the like forming structural parts of aircraft.

In most forms of present-day aircraft it is customary to find external struts or structural members joining or bracing certain portions of the aircraft. For instance, in biplanes, interplane struts are used for bracing the wings, these struts sometimes addressing one or the other wing to which they are attached at an acute angle. Similarly, in monoplanes, wing struts usually join an outer wing portion with the fuselage for assuming lift loads or the like. Such struts address both the fuselage and the wing at acute angles. On any such exposed struts, it is customary to attach streamline fairing to reduce parasite drag of the strut whereby loss of speed is minimized. Frequently, these struts are attached to elements of the aircraft over which the air flows in a path somewhat divergent from the actual line of flight of the craft. For instance, on the upper surface of wings, the air flow is diverted upwardly by the influence on the air stream due to the leading edge of the wing. Thus, the air flow adjacent the top wing surface, instead of following the contour or profile of the wing, slants upwardly. In the same manner, the local air flow at various points on the aircraft may or may not be parallel to the surface of the element, and may or may not be parallel to the line of flight. If any struts, bracing members or other elements of the aircraft lie in this region of diverted air flow, it is logical that to reduce the drag of those elements to the greatest extent possible, their streamline conformation should be such that the major axis of the streamline section should be parallel to the local air flow in the region of such cross section. Thus, the full benefit of the streamline section is realized. If all streamline struts are so organized that the major axis of any cross section is strictly parallel to the line of flight, the minimum drag is not necessarily attained—local air flow at varic's points along such struts may be so angularly divergent from the line of flight that a considerably greater drag is afforded by the local streamline section than would be attained if such streamline section were twisted to conform to the line of local air flow. It is, then, an object of this invention to provide for the minimization of parasite drag by placing the streamlining on all exposed portions of an aircraft, in such relation to the local air stream flowing thereover, that the major axis or chord of the streamline section is parallel to such local air flow. A further and more detailed object of the invention is to provide a streamline wing bracing strut wherein successive longitudinal axes or chords of successive cross sections of the streamline strut section are angularly divergent one from the other.

Other objects will be apparent from a reading of the subjoined specification and claims and from a consideration of the accompanying drawing.

The method by which the proper twisting of the streamline fairing, or the proper angular relation of the major streamline axis to the line of local air flow is obtained, is as follows:—The strut to be faired is equipped with a plurality of sectional streamline blocks, each rotatable upon the strut. Each block may be provided with a vane at its trailing edge to act much like a weather vane, whereby the individual block will be aligned with the direction of, and by, the local air flow. Flight or wind tunnel tests of the aircraft may then be made, and the actual air passing over the strut will cause the streamline blocks to rotate upon the strut until they reach an equilibrium position wherein the drag for the strut at that point will be at an absolute minimum. Thereafter, the positions of the several blocks on the strut may be quantitatively established and a unit fairing for covering the whole strut may then be fabricated, such fairing conforming at successive cross sections thereof with the position reached by the test blocks. Alternatively, the unit strut or member may be fabricated to conform to the test block positions. Thus, the strut fairing will have an optimum efficiency for reducing the drag of the strut with which it is associated, and the local air flow as influenced by adjacent wings or other surfaces will be compensated. A result of fairings organized in accordance with this invention is that the air flow over wings or other surfaces, with which the strut is associated, will be smoother and more uniform, due to the smooth and uniform air flow over the strut itself. In actual aircraft in which this invention has been embodied, noticeable increments in speed have been attained over similar aircraft not equipped with the devices of this invention.

An example of the application of the principles of this invention is shown in the accompanying drawing, in which.

Figure 1:
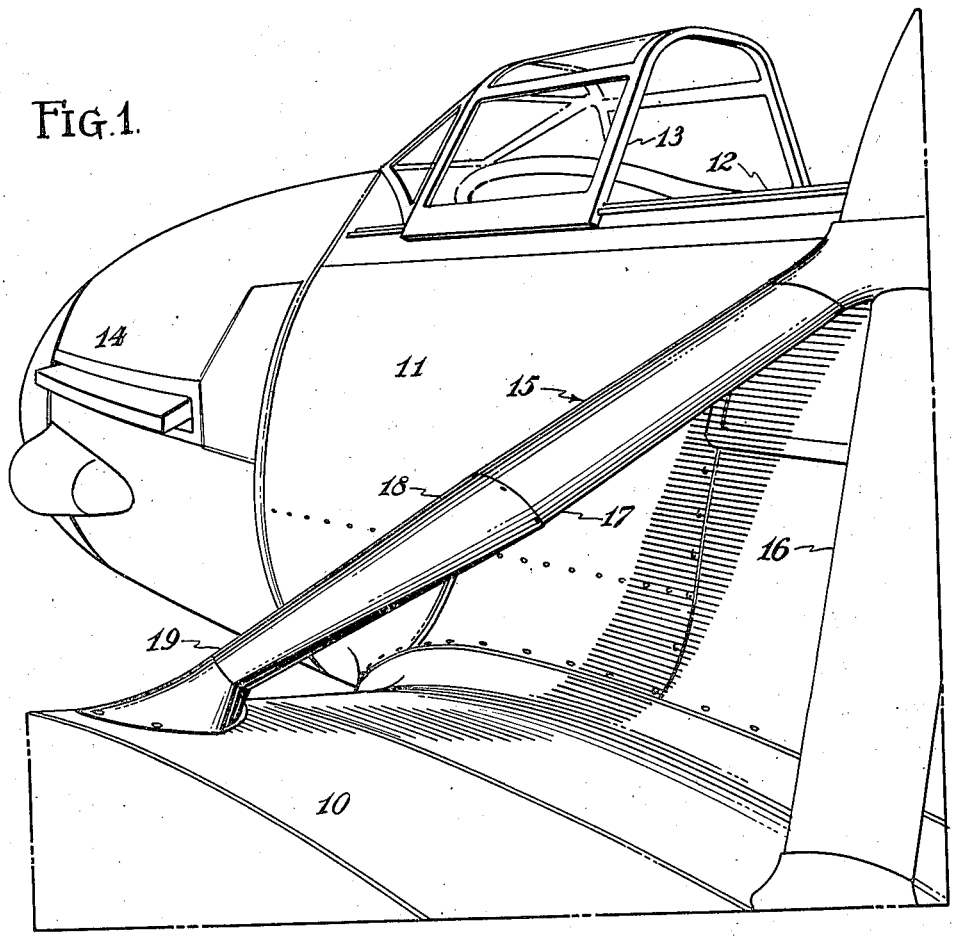
Fig. 1 is a perspective view of the forward portion of an airplane, looking forwardly, showing a strut embodying the streamline fairing.
Figure 2:
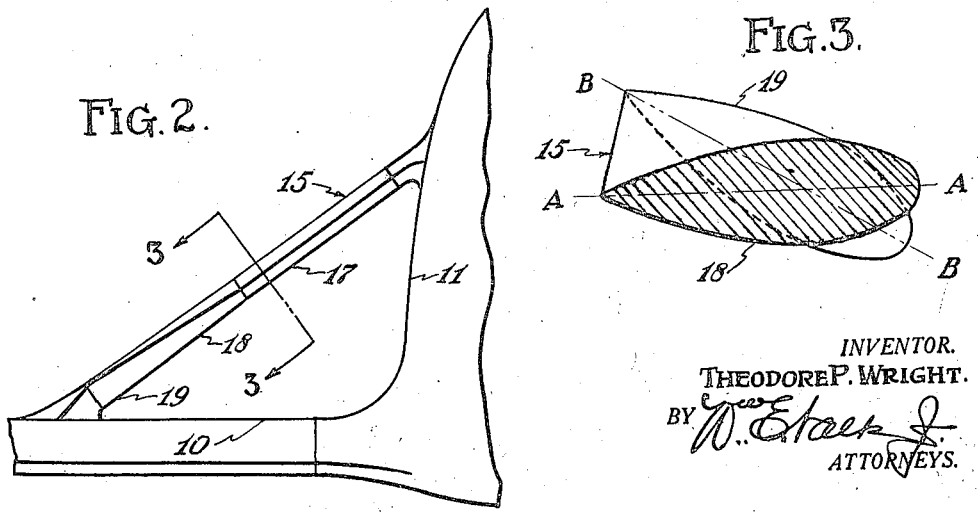
Fig. 2 is a fragmentary rear elevation of a portion of the wing and fuselage of the airplane, showing the strut with the fairing of the invention.
Figure 3:
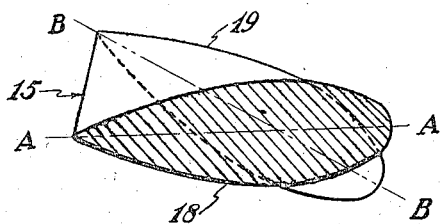
Fig. 3 is a section on the line 3—3 of Fig. 2.

It will be appreciated that any form of aircraft may utilize this invention—the embodiment shown is a low-wing monoplane wherein a wing 10 extends laterally out from the lower portion of the fuselage 11. The usual cockpit 12, provided with a cockpit closure 13, is formed in the fuselage, and a power plant 14 at the forward end of the fuselage 11 provides the necessary propulsive effort. In order to strengthen the wings, a strut 15 extends from the upper portion of the fuselage 11, downwardly and outwardly to the wing 10. A second strut 16 may also be provided rearwardly of the first strut, both being attached to the inner structural members of the wing in conventional manner. The upper half of the strut 15 is provided with a streamline fairing 17, the major axis of which is substantially parallel to the line of flight of the aircraft. This upper half of the strut, as is clear from the drawing, is in a relatively free zone wherein adjacent bodies such as the fuselage or wing have little effect upon the air flow passing thereover. The lower half of the strut 15 joins the wing at a rather acute angle. The air flow over the upper wing surface is diverted from parallelism with the line of flight of the aircraft by the profile of the wing and tends to flow upwardly and rearwardly. Therefore, the air flow over the lower half of the strut 15 is not parallel to the line of flight. In order to reduce the parasite drag of the lower end of the strut to a minimum, a twisted fairing 18 is attached thereto, the fairing, at its lower end 19 being so twisted that the major axis of the streamline section slants upwardly and rearwardly in substantial parallelism with the local air flow at that point. The twist of the fairing from the line of flight becomes less as the fairing becomes more remote from the wing and the influence of the diverted air stream, so that, at its upper end, the major axis of the streamline section is substantially parallel with the line of flight and joins the fairing 17 and the upper half of the strut in flush relation. In Fig. 3, the axis A—A denotes the major axis of the streamline fairing section at points where the air flow is substantially parallel to the direction of flight. The axis B—B is that of the streamline section of the fairing 18 at its lower end, close to the wing 10. It will be noted that there is a very substantial angular divergence between the axes A—A and B—B, and it is this angular divergence which lends greater efficiency to the streamline section in its relation to the airplane. The axes A—A and B—B, and intermediate axes between the two points at which these axes exist in the strut, are all substantially parallel to the local air flow where such axes occur. As previously mentioned, the actual twist of the fairings at successive stages along the strut is preferably obtained by experiment in wind tunnels or in flight.

The principles involved in this invention are equally applicable to the conformation of the surfaces of wings, bodies, cowlings and the like, the ultimate object being to make all exposed surfaces subject to the air stream as nearly parallel with the local air flow as possible, whereby the minimum of drag for the entire aircraft may be attained.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A streamlined strut for aircraft wherein the major axes of successive cross sections of said strut are angularly divergent one from the other without a break in continuity of either the leading or the trailing edge of said strut.

2. In aircraft having a surface organized to divert air flow thereover to an angularly divergent path relative to the line of flight, and having a strut entering said surface at an angle thereto, said strut being subject to said angularly divergent air flow, means for reducing the drag of said strut comprising a streamlined fairing embracing and fixed to said strut, said fairing being twisted through its length to provide a plurality of successive streamlined profiles each having its major axis in substantial parallelism with the direction of local diverted air flow at each said profile.

3. In aircraft having an airfoil wherein the upper cambered surface thereof is organized to divert local air flow away from the airfoil chord line, and a strut intersecting said surface and lying at an acute angle thereto, a streamlined fairing fixed to said strut, the fairing being twisted through its length to provide a streamlined fairing section close to said surface having its major axis slanting upwardly and rearwardly therefrom and to provide fairing sections successively more remote from said surface having their major axes respectively approaching parallelism with said airfoil chord line.

THEODORE P. WRIGHT.